(12) United States Patent
Abe et al.

(10) Patent No.: US 6,260,935 B1
(45) Date of Patent: Jul. 17, 2001

(54) UNPAVED ROAD DETECTION SYSTEM

(75) Inventors: Yasuhiro Abe, Toyota; Masaki Banno, Nagoya; Toshihisa Kato, Anjo; Shinji Tsugawa, Obu; Koichi Kondo, Kasugai; Yasushi Kobayashi, Toyota; Hiroyuki Matsubayashi, Susono, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/218,621

(22) Filed: Dec. 22, 1998

(30) Foreign Application Priority Data

Dec. 23, 1997 (JP) .................................................. 9-365538
Dec. 23, 1997 (JP) .................................................. 9-365544

(51) Int. Cl.⁷ ........................................................ B60T 8/32
(52) U.S. Cl. ......................... 303/196; 303/181; 303/163
(58) Field of Search .................................. 303/181, 196, 303/163, 154

(56) References Cited

U.S. PATENT DOCUMENTS

| | | | |
|---|---|---|---|
| 3,773,364 | * 11/1973 | Michellone et al. | 303/21 P |
| 4,090,741 | * 5/1978 | Rajput | 303/96 |
| 4,672,547 | * 6/1987 | Masaki et al. | 364/426 |
| 5,117,934 | * 6/1992 | Tsuyama et al. | 180/197 |
| 5,423,601 | 6/1995 | Sigl . | |
| 5,627,755 | * 5/1997 | Negrin | 364/426.018 |
| 5,634,699 | * 6/1997 | Ichikawa et al. | 303/150 |
| 5,719,565 | * 2/1998 | Tsuno et al. | 340/905 |
| 5,952,564 | * 9/1999 | Naito et al. | 73/118.1 |

FOREIGN PATENT DOCUMENTS

| | | |
|---|---|---|
| 39 33 652 | 4/1991 | (DE) . |
| 0 583 988 | 2/1994 | (EP) . |
| 7-165053 | 6/1995 | (JP) . |

* cited by examiner

*Primary Examiner*—Robert J. Oberleitner
*Assistant Examiner*—Devon Kramer
(74) *Attorney, Agent, or Firm*—Burns, Doane, Swecker & Mathis, LLP

(57) ABSTRACT

The present invention is directed to an unpaved road detection system wherein a slip rate is calculated on the basis of wheel speeds detected by wheel speed sensors and a vehicle speed detected by a vehicle speed detection device. A linear acceleration sensor is provided for detecting an acceleration of the vehicle in a longitudinal direction thereof to produce a signal linearly proportional to the detected acceleration. A variation of the signal produced by the linear acceleration sensor corresponding to the variation of the slip rate is calculated. The variation of the signal is compared with a reference value. If the variation exceeds the reference value, it is determined that the vehicle is traveling on an unpaved road. The variation may be provided by calculating a difference between a first signal detected by the linear acceleration sensor when the slip rate exceeded a first reference rate, and a second signal detected by the linear acceleration sensor when the slip rate exceeded a second reference rate.

16 Claims, 15 Drawing Sheets

UNPAVED ROAD DETECTION SYSTEM

This application claims priority under 35 U.S.C. Sec. 119 to No. 9-365538 filed in Japan on Dec. 23, 1997 and No. 9-365544 filed in Japan on Dec. 23, 1997, the entire contents of which are herein incorporated by reference.

BACKGROUND OF THE INVENTION

1. Field of the Invention

The present invention relates to an unpaved road detection system, wherein it can be determined whether the vehicle is traveling on unpaved roads including a gravel road and a dirt road, and an anti-skid control system having the unpaved road detection system, wherein brake pressure in each wheel brake cylinder is controlled on the basis of the result of the unpaved road detection system.

2. Description of the Related Arts

Various anti-skid control systems have been proposed heretofore to prevent a wheel from being locked during a braking operation of a vehicle. For example, a Japanese Patent Laid-open Publication No. 7-165053 discloses an anti-skid control system which is provided for estimating a desired slip rate, e.g., a slip rate at which a maximum coefficient of friction $\mu$ will be obtained, before the coefficient of friction $\mu$ of a road will become its maximum value in fact, and controlling the braking force applied to a wheel so as to equalize the actual coefficient of friction to the desired coefficient of friction. In practice, a slip rate is estimated when an acceleration of a wheel will exceed a predetermined value, then a peak of coefficient of friction is calculated on the basis of the wheel acceleration detected a predetermined time later, and then the slip rate at the peak of coefficient of friction is employed as the desired slip rate. In other words, when the variation of the slip rate is large when the acceleration of the wheel has exceeded the predetermined value, it can be estimated that the coefficient of friction will be of almost its peak value, so that the desired slip rate will be set to be of relatively small value, whereas when the variation of the slip rate is small, the desired slip rate will be set to be of relatively large value.

In general, the road for the vehicle can be classified into a smooth road or a rough road, which includes unpaved roads, stone pavement, snow road or the like. The unpaved roads include a gravel road and a dirt road. The dirt road is generally meant by a road of dried soil. The gravel road further includes a sand road, as far as the present invention is concerned. In order to distinguish these various kinds of roads, a detection system for classifying the roads into the smooth road or rough road has been already proposed and practiced. However, no system for determining the unpaved roads including the gravel road and dirt road has been known by now. According to the anti-skid control apparatus on the market, the locking condition of each wheel of the vehicle during the braking operation is controlled on the basis of the road conditions, i.e., smooth or rough. However, it has never been determined whether the vehicle is travelling on the unpaved roads, or not.

According to the anti-skid control system as disclosed in the aforementioned Japanese Patent Laid-open Publication No. 7-165053, the peak of coefficient of friction is estimated on the basis of the wheel acceleration before the coefficient of friction becomes its maximum value. When the vehicle vibrates, however, it is not easy to estimate the peak of coefficient of friction. Especially, on the unpaved roads such as the gravel road and dirt road, the coefficient of friction indicates such a characteristic that the coefficient of friction is gradually increased in response to increase of the slip rate. As a result, it is difficult to estimate the peak of the coefficient of friction, so that the slip rate determined to indicate the peak of the coefficient of friction will be of a relatively large value. Accordingly, it has been required to provide the system for determining the unpaved roads, and the anti-skid control system for controlling the brake pressure in accordance with the output of the unpaved road detection system.

With respect to the anti-skid control operation, it is preferable to provide the braking pressure control when the vehicle is traveling on the gravel road, and the braking pressure control when the vehicle is traveling on the dirt road, separately, rather than the braking pressure control for the unpaved road including the gravel road and dirt road. In the case where the braking pressure control is provided for the gravel road so as to reduce a braking distance, if the same braking pressure control is performed with respect to the dirt road, the vehicle stability might be deteriorated. Or, if the same braking pressure control for the dirt road is performed with respect to the gravel road, the braking distance might be prolonged. However, a system for distinguishing the gravel road from the dirt road has been unknown heretofore.

SUMMARY OF THE INVENTION

Accordingly, it is an object of the present invention to provide an unpaved road detection system for properly detecting an unpaved road including a gravel road and a dirt road.

It is another object of the present invention to provide the unpaved road detection system for properly distinguishing the gravel road from the dirt road.

It is a further object of the present invention to provide a system for properly detecting the unpaved road and preventing wheels of a vehicle from being locked during braking operation of the vehicle, by controlling hydraulic braking pressure in each wheel brake cylinder, even if the vehicle is travelling on the unpaved road including the gravel road and dirt road.

In accomplish the above and other objects, the unpaved road detection system includes wheel speed sensors for detecting wheel speeds of wheels of a vehicle, and a vehicle speed detection device for detecting a vehicle speed of the vehicle, to calculate a slip rate on the basis of the wheel speeds and the vehicle speed. A linear acceleration sensor is provided for detecting an acceleration of the vehicle in a longitudinal direction thereof and producing a signal linearly proportional to the detected acceleration. A variation calculation device is provided for calculating a variation of the signal produced by the linear acceleration sensor corresponding to a variation of the slip rate calculated. And, a determination device is provided for comparing the variation of the signal calculated by the variation calculation device with a reference value, and determining that the vehicle is traveling on an unpaved road, if the variation exceeds the reference value.

The slip rate may be calculated on the basis of the minimum value of the wheel speeds of all of the wheels and the vehicle speed. Or, the slip rate may be calculated on the basis of an average speed of the wheel speeds of all of the wheels and the vehicle speed.

Preferably, the variation calculation device is adapted to calculate a difference between a first signal detected by the linear acceleration sensor when the slip rate exceeded a first reference rate, and a second signal detected by the linear acceleration sensor when the slip rate exceeded a second reference rate, to output the difference as the variation. The variation calculation device may be adapted to differentiate a first signal detected by the linear acceleration sensor when the slip rate exceeded a first reference rate, to output the differentiated value as the variation.

The system for detecting the unpaved road may further include a peak detection device which is adapted to detect a peak of the slip rate calculated by the slip rate calculation device. And, the variation calculation device may be adapted to calculate a difference between a first signal detected by the linear acceleration sensor when the slip rate exceeded a first reference rate, and a third signal detected by the linear acceleration sensor when the peak detection device detected the peak of the slip rate, to output the difference as the variation.

It is preferable to provide a system, which is adapted to detect an unpaved road and prevent wheels of a vehicle from being locked during braking operation, and which includes the unpaved road detection system, and further includes wheel brake cylinders operatively mounted on the wheels, a pressure generating device for pressurizing brake fluid to output hydraulic braking pressure in response to depression of a brake pedal, and an actuator which is disposed between the pressure generating device and the wheel brake cylinders to control the hydraulic braking pressure in each of the wheel brake cylinders in accordance with the slip rate. An adjusting device is arranged to adjust the actuator to control the hydraulic braking pressure in each of the wheel brake cylinders, when the determination device determines that the vehicle is traveling on the unpaved road, to be pressurized higher than the hydraulic braking pressure which is controlled when the vehicle is travelling on a paved road.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
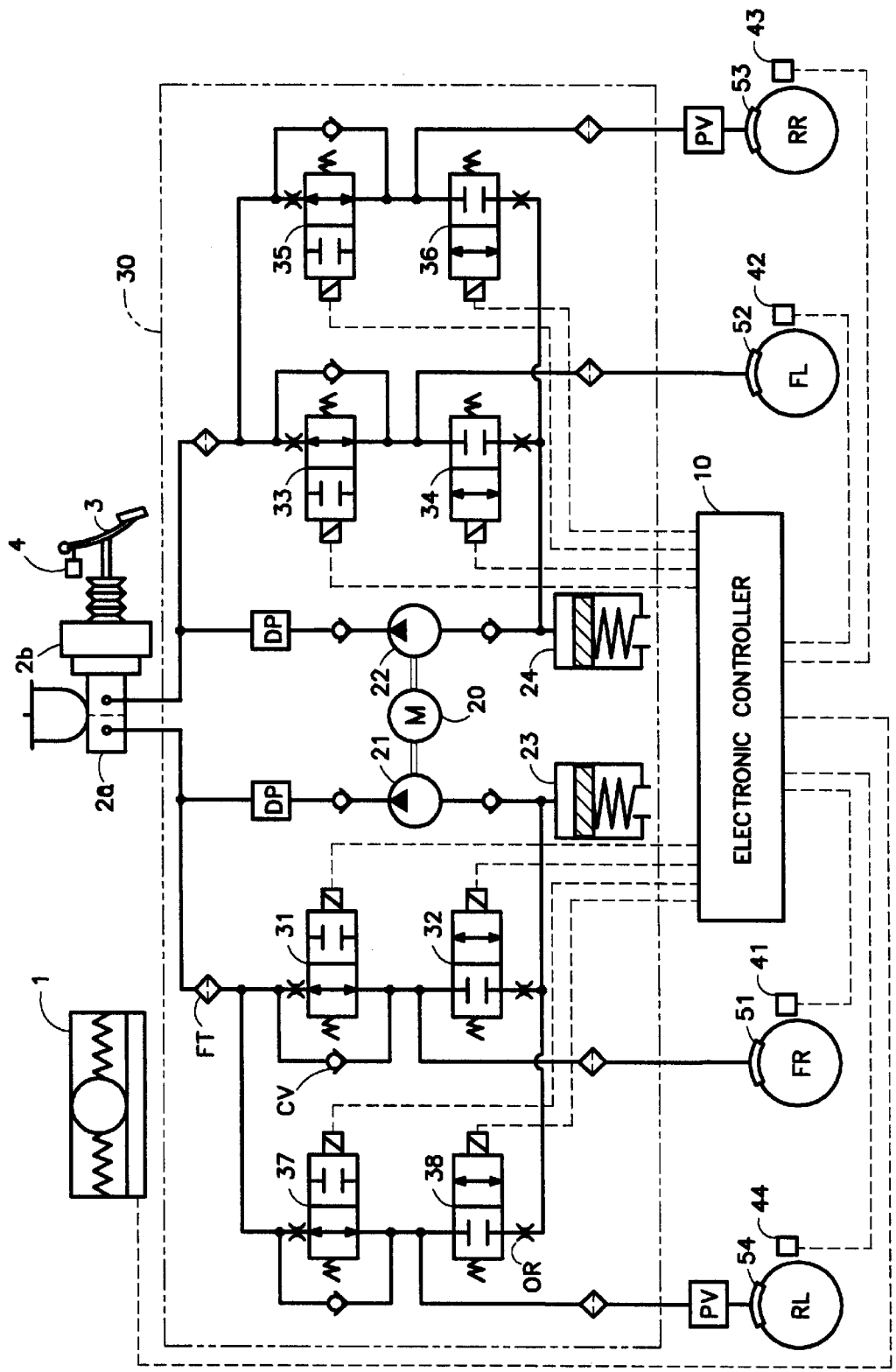
FIG. 1 is a block diagram illustrating an anti-skid control system including an unpaved road detection system according to an embodiment of the present invention.

Referring to FIG. 1, there is schematically illustrated an anti-skid control system according to an embodiment of the present invention, wherein a master cylinder 2a and a booster 2b are driven by a brake pedal 3 to serve as a hydraulic braking pressure generator. Wheel brake cylinders 51 to 54 are operatively mounted on wheels FR, FL, RR, RL of the vehicle, respectively. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a diagonal circuit (X-circuit) system is formed as shown in FIG. 1, while a front-rear dual circuit system may be formed.

Between the master cylinder 2a and the wheel brake cylinders 51 to 54, an actuator 30 is disposed for use in the anti-skid control (ABS). The actuator 30 is formed as enclosed by a two-dot chain line in FIG. 1. Normally open solenoid valves 31, 37 are disposed in hydraulic pressure passages for connecting one output port of the master cylinder 2a with the wheel brake cylinders 51, 54, respectively, and an output port of a hydraulic pressure pump 21 is connected to a position between the master cylinder 2a and the valves 31, 37. Likewise, normally open solenoid valves 33, 35 are disposed in passages for connecting another output port of the master cylinder 2a with the wheel brake cylinders 52, 53, respectively, and an output port of a hydraulic pressure pump 22 is connected to a position between the master cylinder 2a and the valves 33, 35. The hydraulic pressure pumps 21, 22 are driven by an electric motor 20 to supply pressurized brake fluid into each hydraulic pressure passage. The wheel brake cylinders 51, 54 are connected to the normally closed solenoid valves 32, 38, the downstream side of which are connected to a reservoir 23 and the input port of the pump 21. The wheel brake cylinders 52, 53 are connected to the normally closed solenoid valves 34, 36, the downstream side of which are connected to a reservoir 24 and the input port of the pump 22. Each of the reservoirs 23, 24 has a piston and a spring as shown in FIG. 1 to store the brake fluid discharged from the wheel brake cylinders through the solenoid valves 32, 34, 36, 38.

The solenoid valves 31 to 38 are of two-port two-position solenoid operated changeover valves which are placed in their first operating positions as shown in FIG. 1 to communicate the wheel brake cylinders 51 to 54 with the master cylinder 2a. When the solenoid of the valves are energized, they are placed in their second operating positions to block the communication between the wheel brake cylinders 51 to 54 and the master cylinder 2a, and communicate the wheel brake cylinders 51 to 54 with the reservoir 23 or 24. In FIG. 1, "PV" indicates a proportioning valve, "DP" indicates a damper, "CV" indicates a check valve, "OR" indicates an orifice, and "FT" indicates a filter. Each check valve CV is provided for allowing the flow of the brake fluid from the wheel brake cylinders 51 to 54 and reservoirs 23, 24 toward the master cylinder 2a and preventing the reverse flow. With the solenoid valves 31 to 38 controlled to be energized or de-energized, the hydraulic braking pressure in the wheel brake cylinders 51 to 54 will be increased, decreased or held. That is, when the solenoid valves 31 to 38 are de-energized, the hydraulic braking pressure in the master cylinder 2a and the pressure pump 21 or 22 is supplied into the wheel brake cylinders 51 to 54 to increase the hydraulic braking pressure therein, whereas when the solenoid valves 31 to 38 are energized, the wheel brake cylinders 51 to 54 are communicated with the reservoir 23 or 24 to decrease the hydraulic braking pressure in the wheel brake cylinders 51 to 54. Or, when the solenoid valves 31, 33, 35, 37 are energized, and the solenoid valves 32, 34, 36, 38 are de-energized, the hydraulic pressure in the wheel brake cylinders 51 to 54 will be held. Therefore, by controlling the time period between the energizing the solenoid valves and de-energizing them, a pulse pressure increasing, or stepped pressure increasing operation will be performed to increase the pressure gradually, or may be performed to decrease the pressure gradually.

The solenoid valves 31 to 38 are electrically connected to an electronic controller 10 to energize or de-energize each solenoid valve. Wheel speed sensors 41 to 44 are mounted on the wheels FR, FL, RR, RL to feed rotational speeds of the wheels, i.e., wheel speed signals to the controller 10, respectively. A linear longitudinal acceleration sensor 1 (hereinafter, referred to as a linear G sensor 1) is mounted on the vehicle, to feed its output signal to the controller 10. Furthermore, connected to the controller 10 are a brake switch 4 which is turned on when the brake pedal 3 is depressed, and etc. The linear G sensor 1 is a sensor for converting a movement of a weight in a longitudinal direction, which is caused in accordance with the acceleration or deceleration of the vehicle, into an electric signal to be linearly proportional to the vehicle acceleration (including the deceleration), which has been on the market, so that its detailed explanation will be omitted. The electronic controller 10 is provided with a microcomputer (not shown) which includes a central processing unit (CPU), memories (ROM, RAM), a timer, an input interface, an output interface, and etc.

Figure 2A:
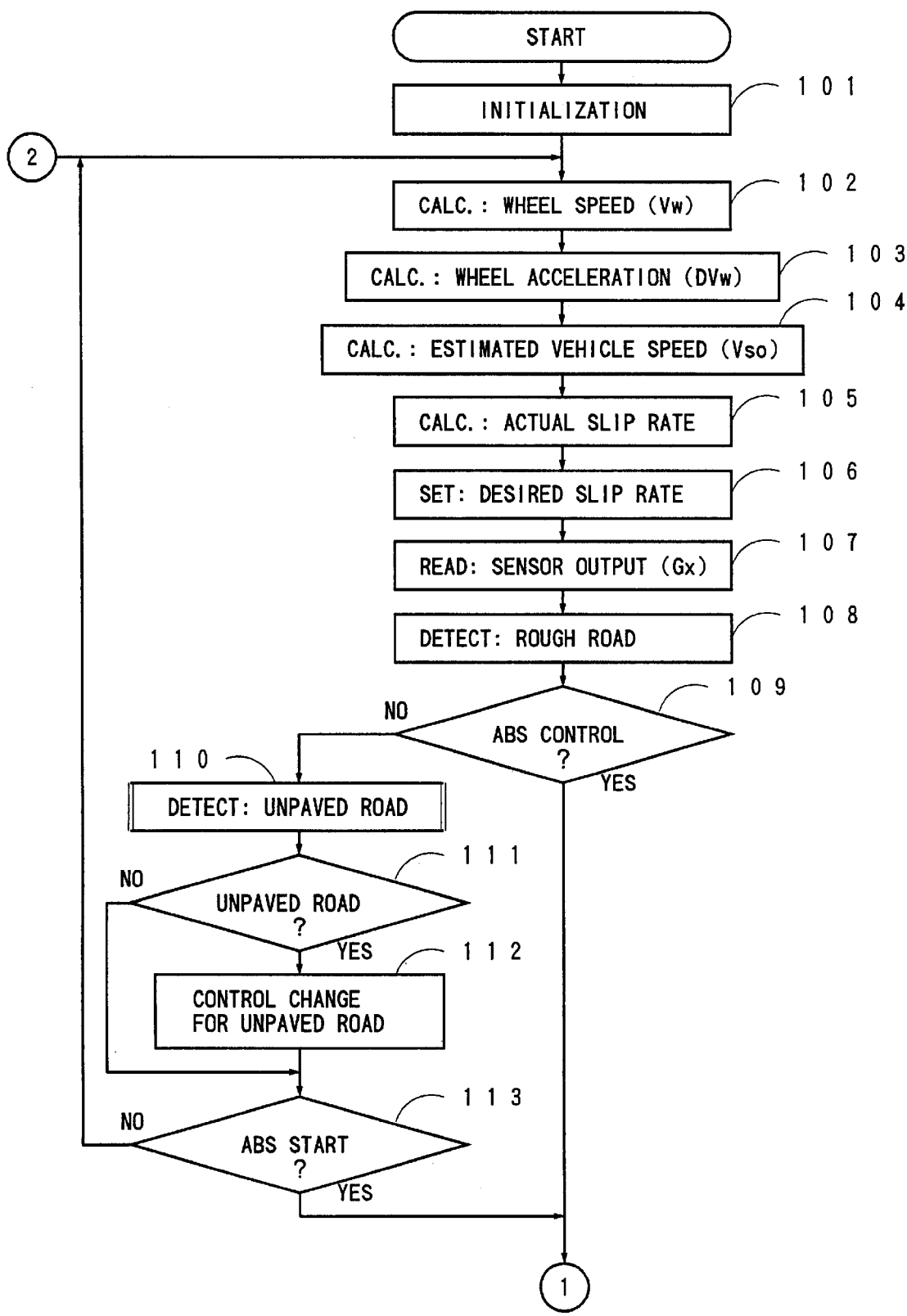
FIG. 2A and FIG. 2B are a flowchart showing a main routine of an anti-skid control according to an embodiment of the present invention.
Figure 2B:
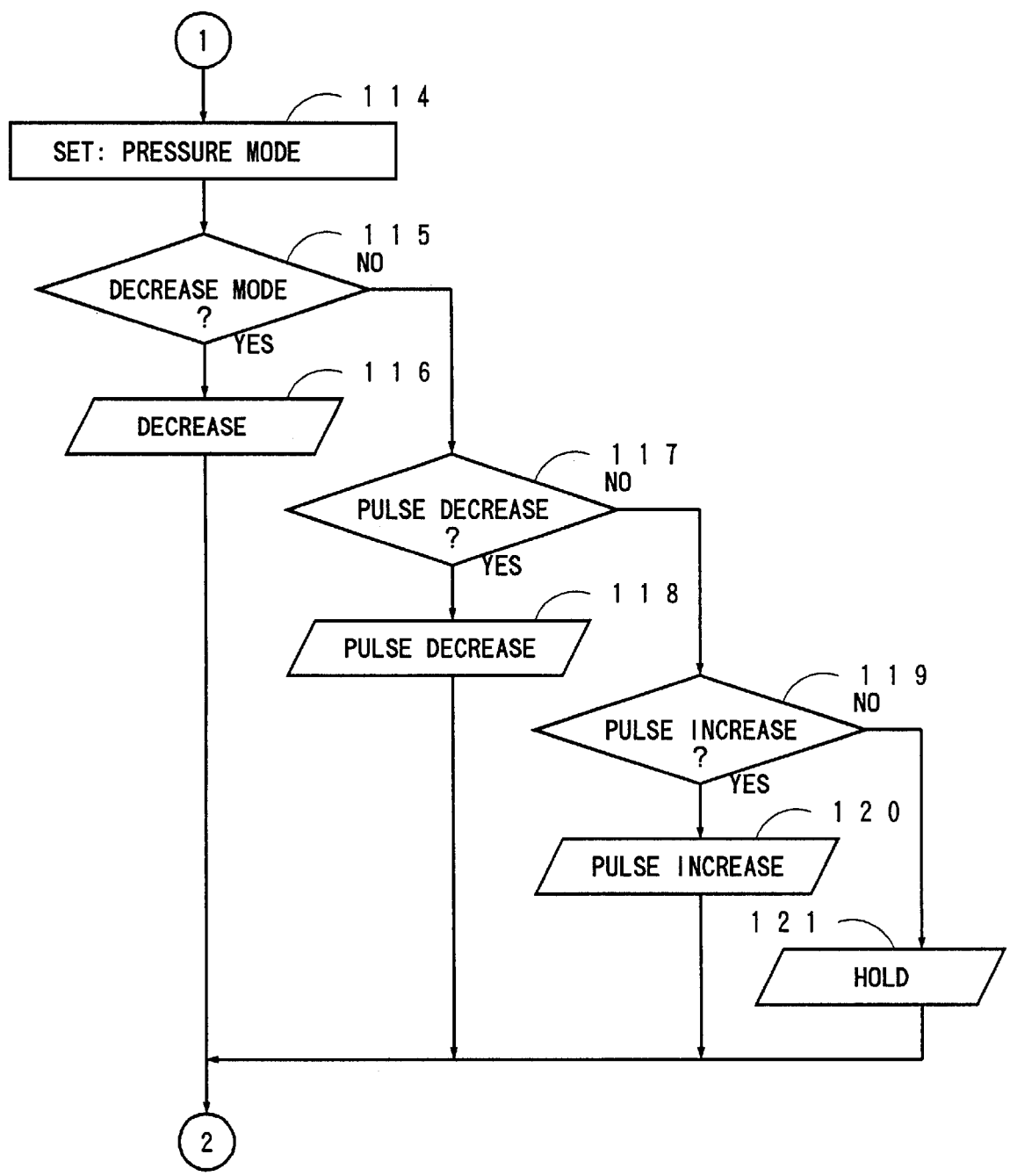

According to the present embodiment as constituted above, the anti-skid control will be performed by the controller 10 to control the actuator 30, in accordance with a program as shown in FIGS. 2A, 2B. The program routine starts when an ignition switch (not shown) is turned on. At the outset, the program provides for initialization of the system at Step 101 to clear various data. At Step 102, the signals detected by the wheel speed sensors 41 to 44 are read by the controller 10 to calculate each wheel speed (represented by "Vw"), and differentiated to provide a wheel acceleration (DVw). At Step 104, an estimated vehicle speed (Vso) is calculated on the basis of each wheel speed (Vw). The estimated vehicle speed (Vso) may be calculated by $MED(\alpha_{DN}t, Vw, \alpha_{UP}t)$. The "MED" indicates a function for obtaining an intermediate value. "$\alpha_{UP}$" is a value indicative of an upper limit side (to be greater than the wheel speed (Vw)) of the vehicle acceleration (including the deceleration), "$\alpha_{DN}$" is a value indicative of a lower limit side (to be smaller than the wheel speed (Vw)) of the vehicle acceleration (including the deceleration), and "t" indicates a time. The vehicle speed may be detected directly by a sensor for detecting the speed of the vehicle relative to the ground.

The program proceeds to Step 105, where an actual slip rate of each wheel for use in the anti-skid control (represented by "Sa") is calculated, in accordance with the following equation:

$$Sa=(Vso-Vw)/Vso$$

Then, at Step 106, a desired slip rate is set for each wheel. Next at Step 107, an output (Gx) of the linear G sensor 1 is read. At Step 108, a determination of a rough road is made. The rough road in this case includes not only the unpaved road, but also the stone pavement and snow road. And, the program proceeds to Step 109, where it is determined whether the anti-skid control is being performed or not. Unless the anti-skid control is being performed, the program proceeds to Step 110 where it is determined whether the vehicle is traveling on the unpaved road or not, as described later in detail with reference to FIG. 3. If it is determined that the vehicle is traveling on the unpaved road, the program proceeds to Step 112, where the conditions of the anti-skid control are set for the unpaved road, then proceeds to Step 113. Otherwise, the program proceeds from Step 111 to Step 113. The conditions for the unpaved road set at Step 112 are provided for controlling the hydraulic braking pressure in each wheel brake cylinder when the vehicle is traveling on the unpaved road, to be pressurized higher than the hydraulic braking pressure which is controlled during the anti-skid control operation when the vehicle is travelling on a paved road. For this purpose, (1) the desired slip rate is set to be relatively large, so as to increase the pressure increasing amount and reduce the pressure decreasing amount, comparing with the braking pressure control when the vehicle is travelling on the paved road, (2) a hold mode, which is generally performed immediately after a pressure decrease mode is terminated, is prohibited, (3) the value ($\alpha_{UP}$) indicative of the upper limit of the vehicle acceleration ($\alpha$) used for the calculation of the estimated vehicle speed (Vso) is set to be relatively small, and (4) a reference vehicle speed for determining a termination of the control is set to be relatively high.

At Step 113, a locking condition of each wheel is determined on the basis of the wheel speed (Vw) and wheel acceleration (DVw), for example, so as to determine whether the conditions for initiating the anti-skid operation have been fulfilled or not. If the conditions have been fulfilled, the program proceeds to Step 114 and Steps following it as shown in FIG. 2B, otherwise the program returns to Step 102. Then, at Step 114, one of the pressure modes including the pressure decrease mode, pulse pressure decrease mode, pulse pressure increase mode and hold mode is selected on the basis of the locking condition of each wheel, and the program proceeds to Steps 115–121, where pressure control signals are output in accordance with the selected pressure mode. Accordingly, the solenoid coils of the valves 31 to 38 are energized or de-energized, in accordance with the selected pressure mode, to increase, decrease or hold the hydraulic braking pressure in the wheel brake cylinders 51 to 54 (i.e., wheel cylinder pressure).

Figure 3:
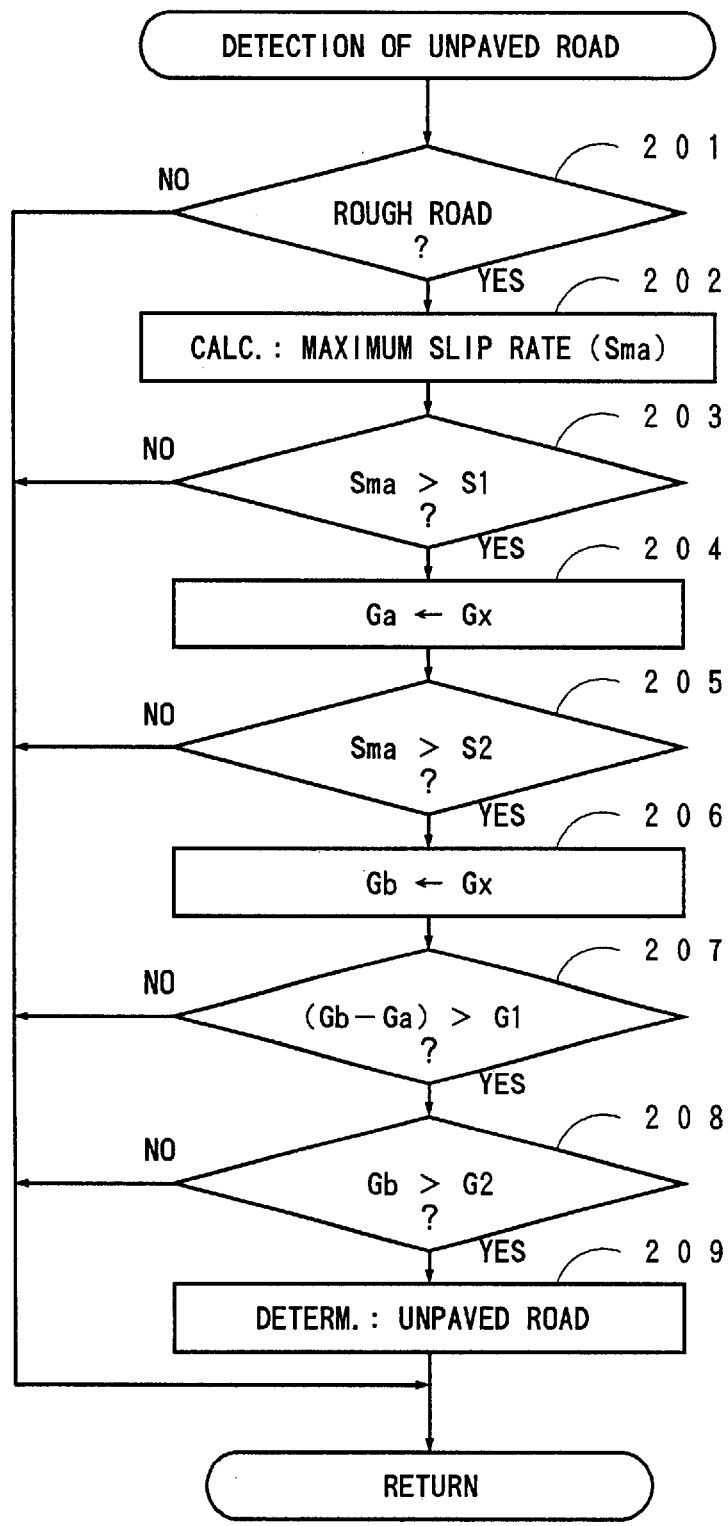
FIG. 3 is a flowchart showing a sub-routine of detection of an unpaved road according to an embodiment of the present invention.
Figure 8:
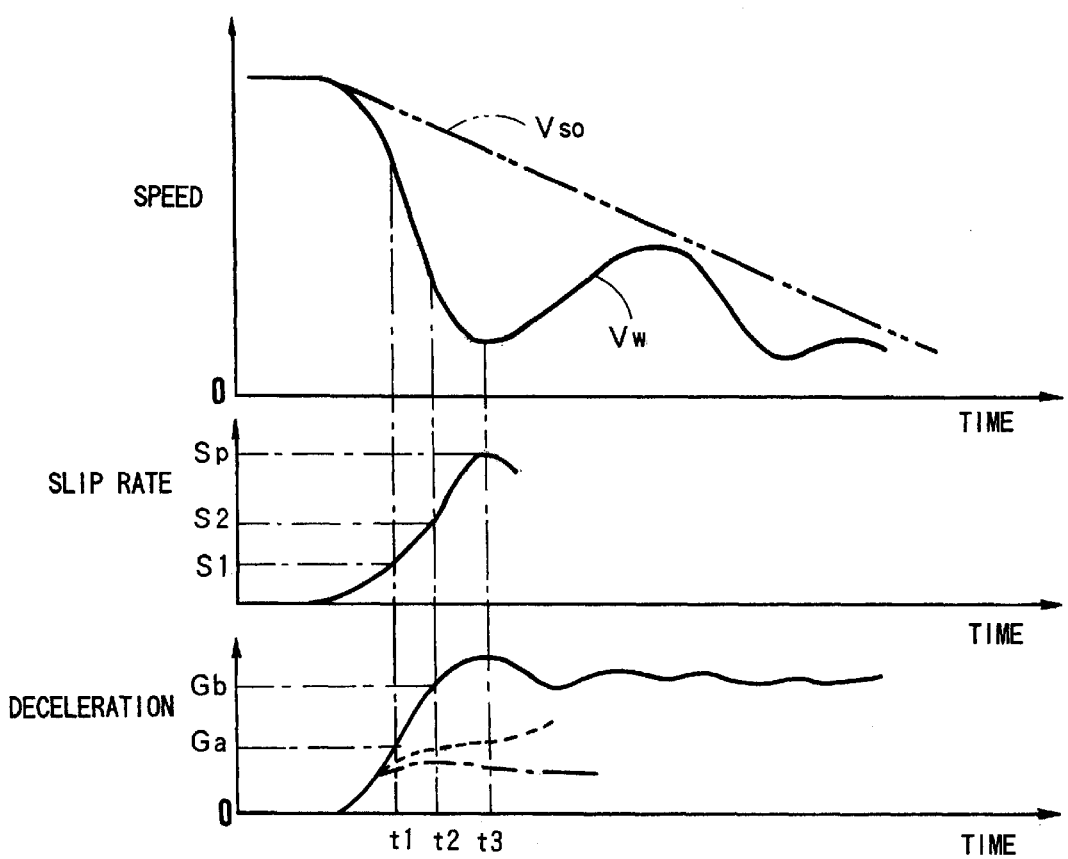
FIG. 8 is a diagram showing variations of wheel speed, slip rate and deceleration according to an embodiment of the present invention.

FIG. 3 shows the detection of the unpaved road executed at Step 110 in FIG. 2A. At the outset, it is determined at Step 201 whether the vehicle is travelling on the rough road or not, on the basis of the result of determination of the rough road executed at Step 108. Unless the vehicle is traveling on the rough road, the program returns to the main routine. If it is determined that the vehicle is traveling on the rough road, the program proceeds to Step 202 and the Steps following it, where it is determined if the rough road is the unpaved road. At step 202, the minimum speed MIN(Vw) of the wheel speeds of all the wheels of the vehicle is calculated, and then the maximum slip rate (Sma) is calculated on the basis of the minimum speed MIN(Vw) and the estimated vehicle speed (Vso). Then, the program proceeds to Step 203 where it is determined if the maximum slip rate (Sma) has increased from the value lower than a first reference slip rate (S1, e.g., 10%) to exceed the reference slip rate (S1). In other words, in the case where the maximum slip rate (Sma) calculated at the previous cycle was smaller than the first reference slip rate (S1), and the maximum slip rate (Sma) calculated at the present cycle becomes greater than the first reference slip rate (S1), then the program proceeds to Step 204, otherwise the program returns to the main routine. At Step 204, the output (Gx) of the linear G sensor 1, which is obtained when the maximum slip rate (Sma) has exceeded the first reference slip rate (S1), is set to be a deceleration (Ga), as illustrated in FIG. 8. Next, the program proceeds to Step 205 where it is determined if the maximum slip rate (Sma) has increased from the value lower than a second reference slip rate (S2, e.g., 30%) to exceed the reference slip rate (S2). If the result is affirmative, then the program proceeds to Step 206, otherwise the program returns to the main routine. At Step 206, the output (Gx) of the linear G sensor 1, which is obtained when the maximum slip rate (Sma) has exceeded the second reference slip rate (S2), is set to be a deceleration (Gb).

Then, the program proceeds to Step 207 where a difference between the decelerations (Gb) and (Ga) is calculated, and its result will be compared in magnitude with a first reference value (G1). If the result of comparison is that the difference between the decelerations (Gb) and (Ga) is larger than the first reference value (G1), the program proceeds to Step 208, otherwise the program returns to the main routine. In this respect, the decelerations (Ga), (Gb) are indicated by positive values, and if the difference between the decelerations (Gb) and (Ga) is larger than the first reference value (G1), which is a positive value, it means that the deceleration, which is obtained when the maximum slip rate (Sma) exceeded the second reference slip rate (S2), is larger than the deceleration, which is obtained when the maximum slip rate (Sma) exceeded the first reference slip rate (S1), by the first reference value (G1), as shown in FIG. 8.

Figure 9:
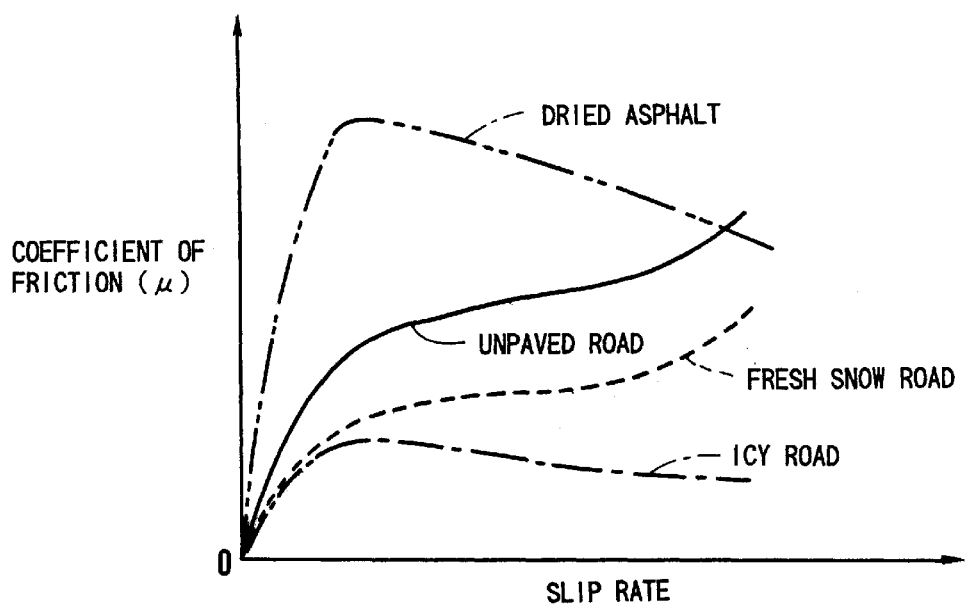
FIG. 9 is a diagram showing slip rate—coefficient of friction characteristic for various roads according to another embodiment of the present invention.

In the case where the deceleration, which is obtained when the maximum slip rate (Sma) exceeded the second reference slip rate (S2), is determined to be larger than the deceleration, which is obtained when the maximum slip rate (Sma) exceeded the first reference slip rate (S1), by the first value (G1), the road is likely to be unpaved. However, sometimes it is difficult to distinguish the unpaved road from a fresh snow road having a characteristic as shown by a broken line in FIG. 9. Therefore, in order to distinguish the unpaved road from the fresh snow road or the like, the deceleration (Gb), which is obtained when the maximum slip rate (Sma) exceeded the second reference slip rate (S2), is compared with a second reference value (G2), which is a positive value, at Step 208. If the result of comparison is that the deceleration (Gb) is larger than the second reference value (G2), the road will be determined to be the unpaved road, i.e., the gravel road or dirt road, thereby to be distinguished from the fresh snow road or the like.

Figure 4:
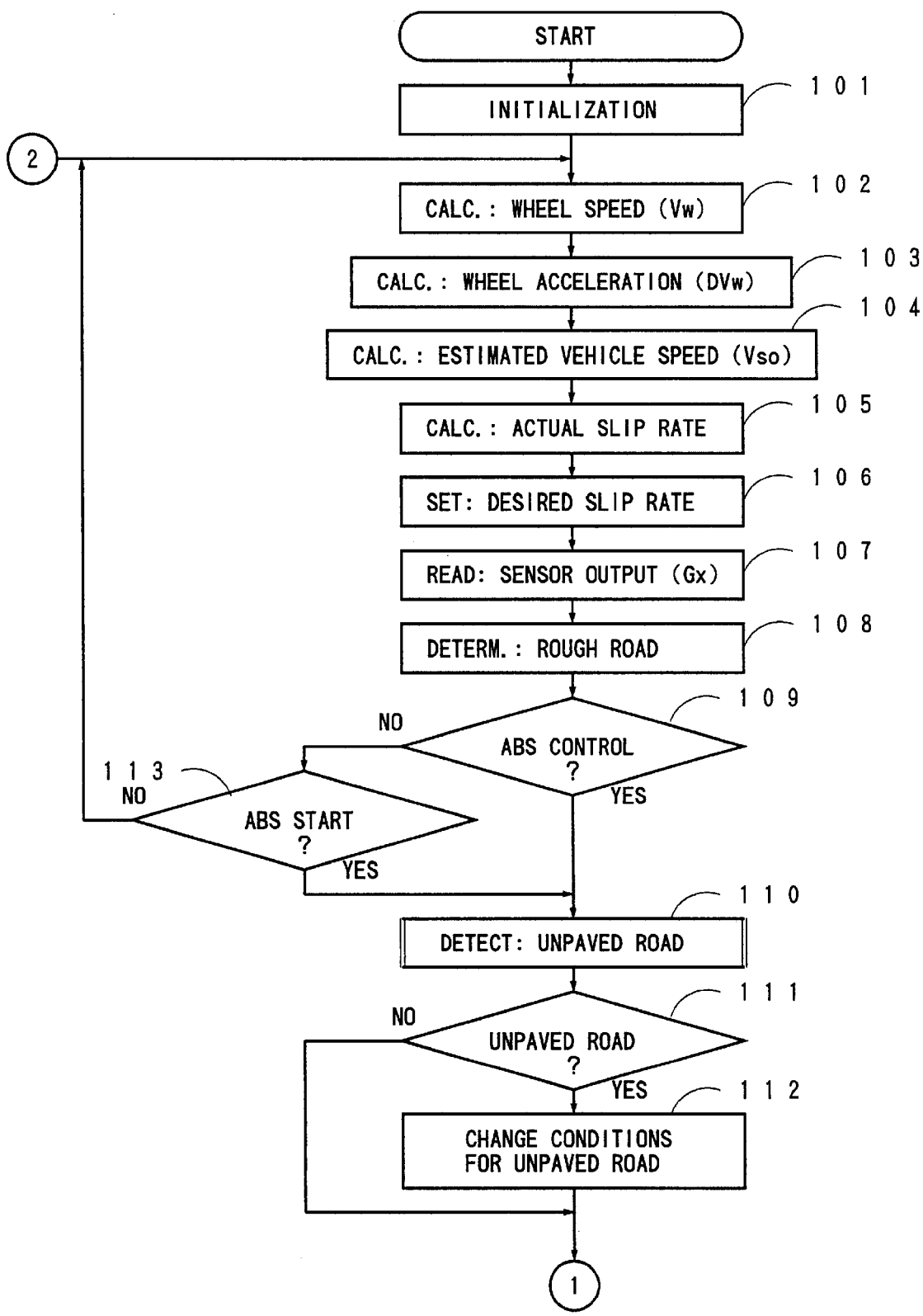
FIG. 4 is a flowchart showing a main routine of an anti-skid control according to another embodiment of the present invention.
Figure 5:
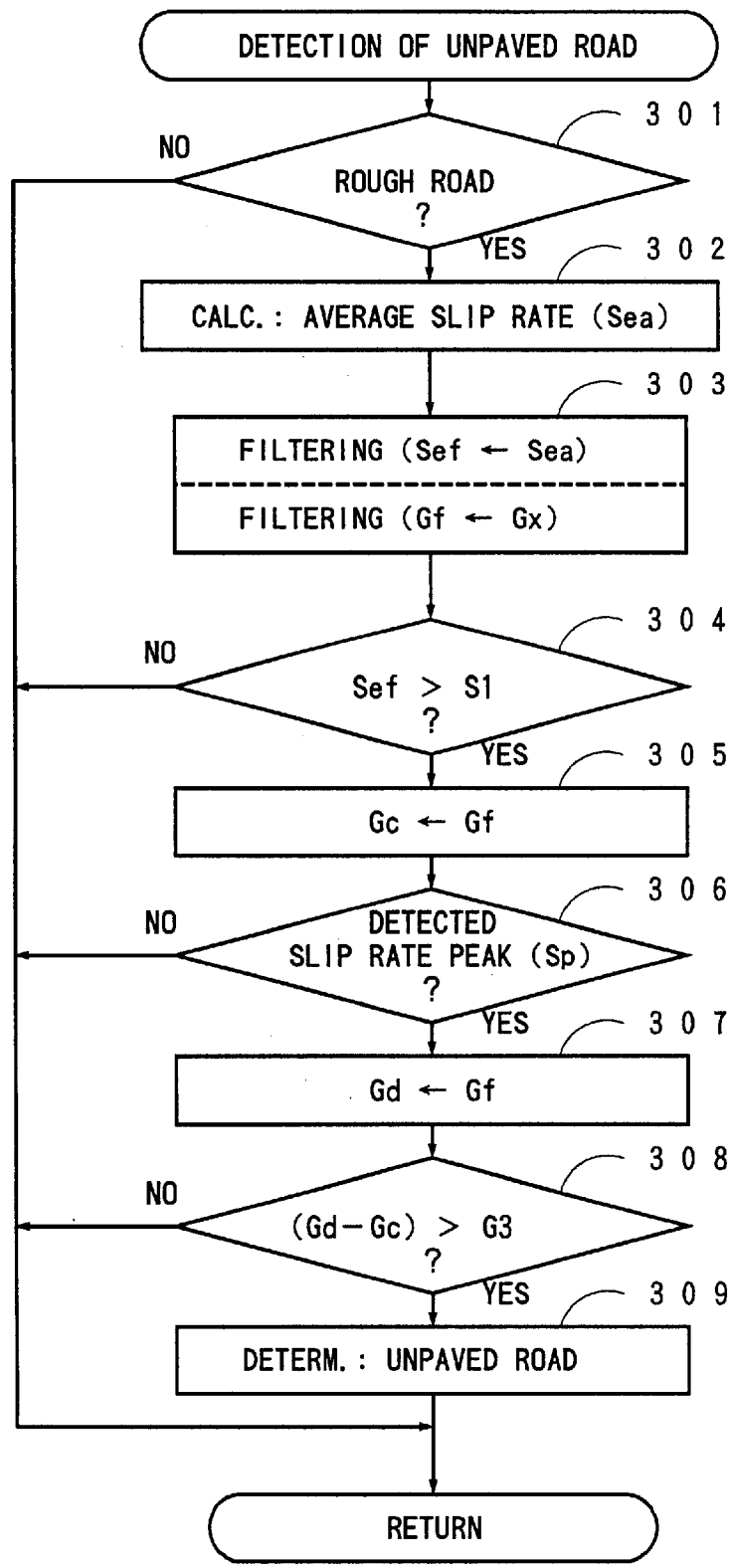
FIG. 5 is a flowchart showing a sub-routine of detection of an unpaved road according to a further embodiment of the present invention.

FIG. 4 shows another embodiment of the anti-skid control, wherein Steps 101–109 are the same as Steps 101–109 as shown in FIG. 2A, and Steps 110–121 are the same as Steps 110–121 shown in FIGS.2A and 2B. According to the program as shown in FIGS. 2A, 2B, the detection of the unpaved road is made at Step 110 before the anti-skid control starts. However, the detection of the unpaved road is made at Step 110 after the anti-skid control started, according to the program as shown in FIG. 4. Therefore, the detection of the unpaved road will be different from the Steps as shown in FIG. 3, and will be made as shown in FIG. 5. Although Step 301 in FIG. 5 is the same as Step 201 in FIG. 3, an average slip rate (Sea) is calculated on the basis of the average wheel speed (Vea) of all the wheels at Step 302 (Sea=(Vso−Vea)/Vso). Thus, when the average of the slip rates of all of the wheels is used, a μ-S (coefficient of friction slip−rate) curve corresponds to a G-S (vehicle deceleration-slip rate) curve accurately. However, since a rapid process is required at Step 201 in FIG. 3, the maximum slip rate (Sma) of the slip rates of four wheels is calculated. In the case where it remains enough time, such as the case after the initiation of the anti-skid control, as shown in FIG. 4, the average of the slip rates of all of the wheels is used. Therefore, the average slip rate (Sea) may be used at Step 202 in FIG. 3.

Referring back to FIG. 5, filtering operation is made to the slip rate (Sea) and the output (Gx) of the linear G sensor 1 at Step 303, and the filtered values (Sef), (Gf) are used for the subsequent controls. Then, the program proceeds to Step 304, where it is determined whether the filtered value (Sef) of the average slip rate (Sea) has increased from the value lower than a first reference rate (S1, e.g., 10%) to exceed the first reference rate (S1). If the result is affirmative, the program proceeds to Step 305, otherwise the program returns to the main routine. At Step 305, the filtered value (Gf) output from the linear G sensor 1 when the filtered value (Sef) of the average slip rate (Sea) exceeded the first reference rate (S1) is set as the deceleration (Gc). Next, the program proceeds to Step 306 where the slip rate peak (Sp) was detected or not. When the slip rate was increased to become its maximum value at the time (t3) as shown in FIG. 8, the slip rate calculated at that time is used for the slip rate peak (Sp), which is used instead of the second reference rate (S2). That is, when the slip rate peak (Sp) was detected, the program proceeds to Step 307 where the filtered value (Gf) of the output of the linear G sensor 1 is set as the deceleration (Gd), otherwise the program returns to the main routine. The slip rate obtained when the differential value of the filtered value (Sef) of the average slip rate (Sea) was changed from a negative value to a positive value, is used for the slip rate peak (Sp). Then, the program proceeds to Step 308 where a difference between the deceleration (Gd) and the deceleration (Gc) is calculated, and compared in magnitude with a third reference value (G3). If the result is that the difference between the deceleration (Gd) and deceleration (Gc) is larger than the third reference value (G3), the program proceeds to Step 309, otherwise the program returns to the main routine. In other words, if the deceleration (Gd), which is detected when the slip rate peak (Sp) was detected, is larger than the deceleration (Gc), which is detected when the filtered value (Sef) of the average slip rate (Sea) exceeded the first reference slip rate (S1), by more than the third reference value (G3), the program proceeds to Step 309 where it is determined that the road on which the vehicle is traveling is unpaved.

Figure 6:
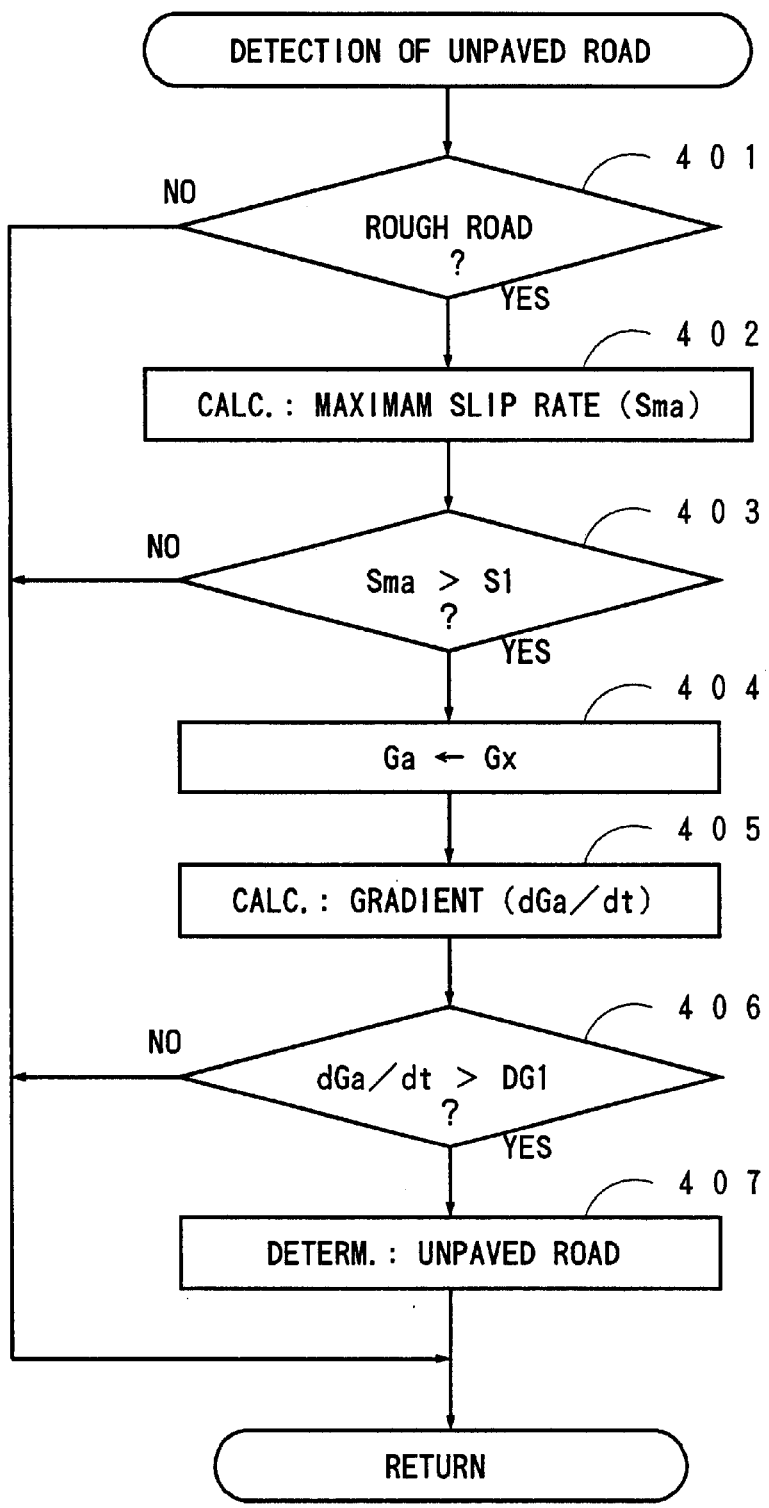
FIG. 6 is a flowchart showing a sub-routine of detection of an unpaved road according to a yet further embodiment of the present invention.

FIG. 6 shows another embodiment of the detection of the unpaved road. Steps 401–404 are the same as Steps 201–204 in FIG. 3, and Step 407 is the same as Steps 209 in FIG. 3. According to the detection of the unpaved road in FIG. 6, the output (Gx) of the linear G sensor 1 produced when the maximum slip rate (Sma) of the wheel speeds of all of the wheels exceeded the first reference slip rate (S1) is set as the deceleration (Ga), which is differentiated at Step 405. The differentiated value (dGa/dt) represents a gradient of the deceleration (Ga) obtained when the maximum slip rate (Sma) of all of the wheels exceeded the first reference slip rate (S1). Therefore, the gradient (dGa/dt) is compared with a first reference gradient (DG1) at Step 406. If it is larger than the first reference gradient (DG1), it will be determined at Step 407 that the road is unpaved.

Figure 7:
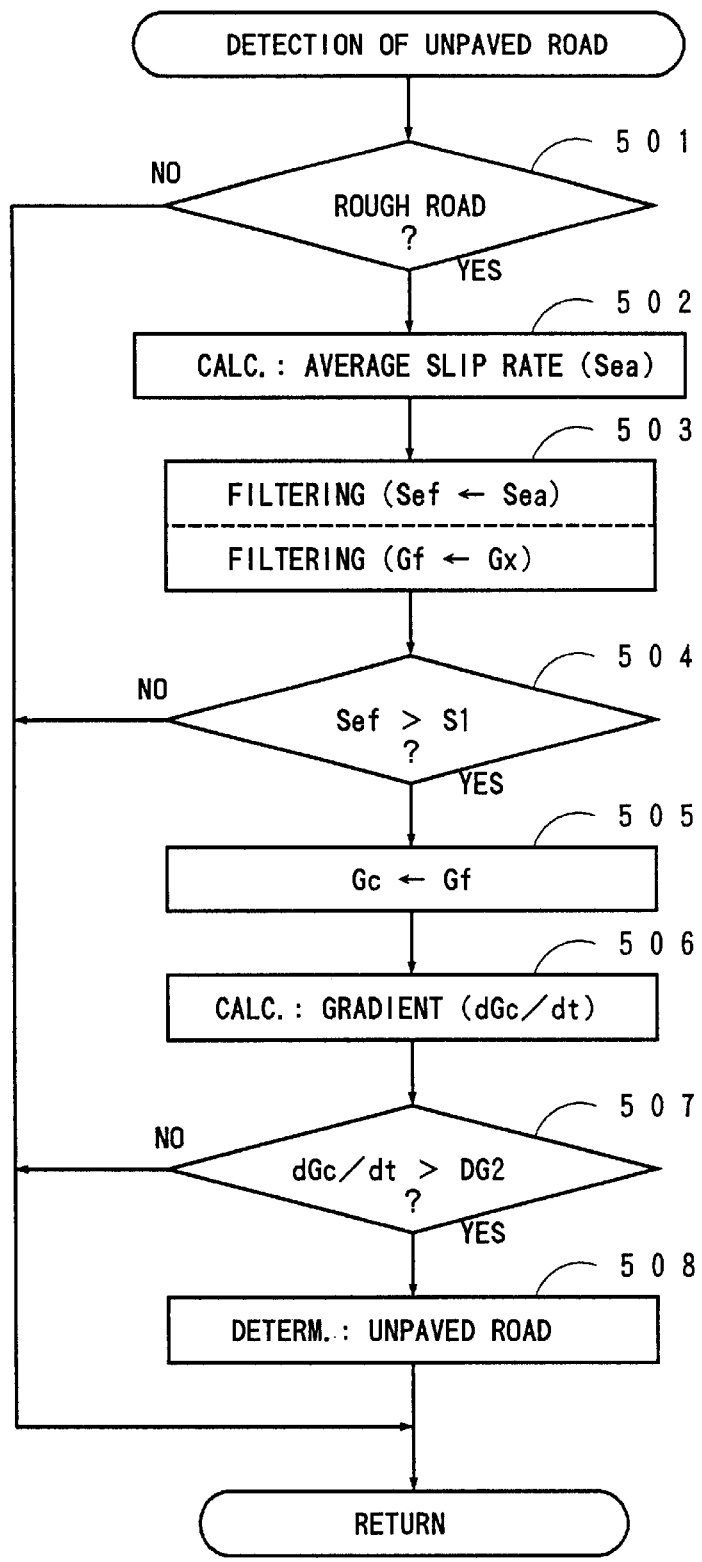
FIG. 7 is a flowchart showing a sub-routine of detection of an unpaved road according to a yet further embodiment of the present invention.

FIG. 7 shows a further embodiment of the detection of the unpaved road. Steps 501–505 are the same as Steps 301–305 in FIG. 5, and Step 508 is the same as Steps 309 in FIG. 5. According to the detection of the unpaved road in FIG. 7, the filtered value (Gf) of the output of the linear G sensor 1 produced when the filtered value (Sef) of the average slip rate (Sea) of all of the wheels exceeded the first reference slip rate (S1) is set at Step 505 as the deceleration (Gc), which is differentiated at Step 506. The differentiated value (dGc/dt) represents a gradient of the deceleration (Gc) obtained when the filtered value (Sef) of the average slip rate (Sea) of all of the wheels exceeded the first reference slip rate (S1). Therefore, the gradient (dGc/dt) is compared with a second reference gradient (DG2) at Step 507. If it is larger than the second reference gradient (DG2), it will be determined at Step 508 that the road is unpaved.

Figure 10:
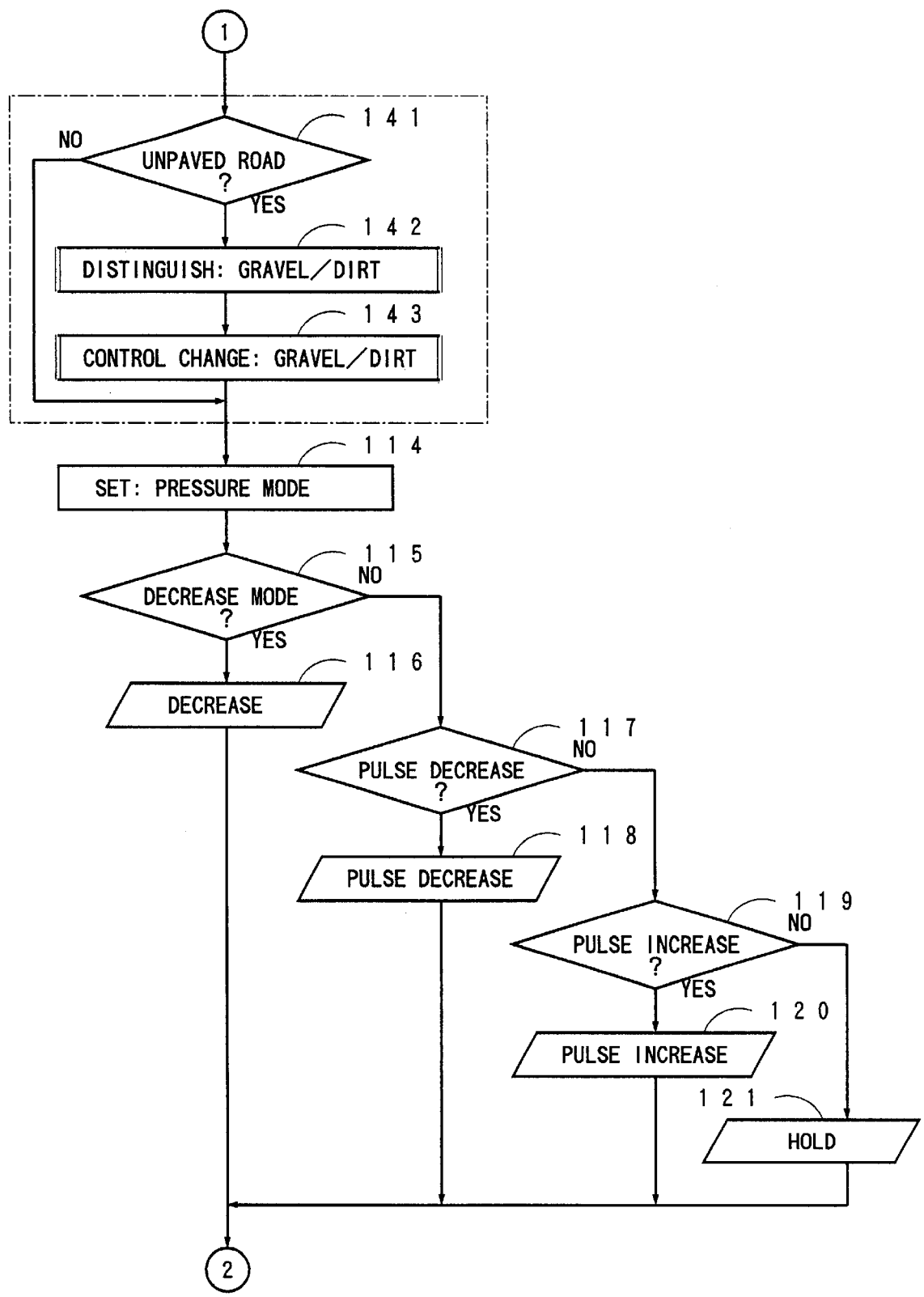
FIG. 10 is a flowchart showing a part of a main-routine of an anti-skid control according to another embodiment of the present invention.

FIG. 10 shows a part of a main routine of anti-skid control according to another embodiment of the present invention, which is adapted to distinguish between the gravel road and the dirt road. According to this embodiment, the Steps encompassed by a two-dot chain line in FIG. 10 are added to the flowchart as shown in FIGS. 2A and 2B. That is, after it is determined at Step 109 that the anti-skid control is being performed, or determined at Step 113 that the conditions for initiating the anti-skid control have been filled, the program proceeds to Step 141 where the road on which the vehicle is travelling is unpaved or not. If it is determined that the road is unpaved, the program proceeds Steps 142, 143, otherwise the program proceeds to Step 114. At Step 142, the gravel road and the dirt road are distinguished one from the other, and the conditions of the anti-skid control will be changed to the one for the gravel road or the one for the dirt road at Step 143, as described later in detail with reference to FIGS. 11 and 12.

Figure 11:
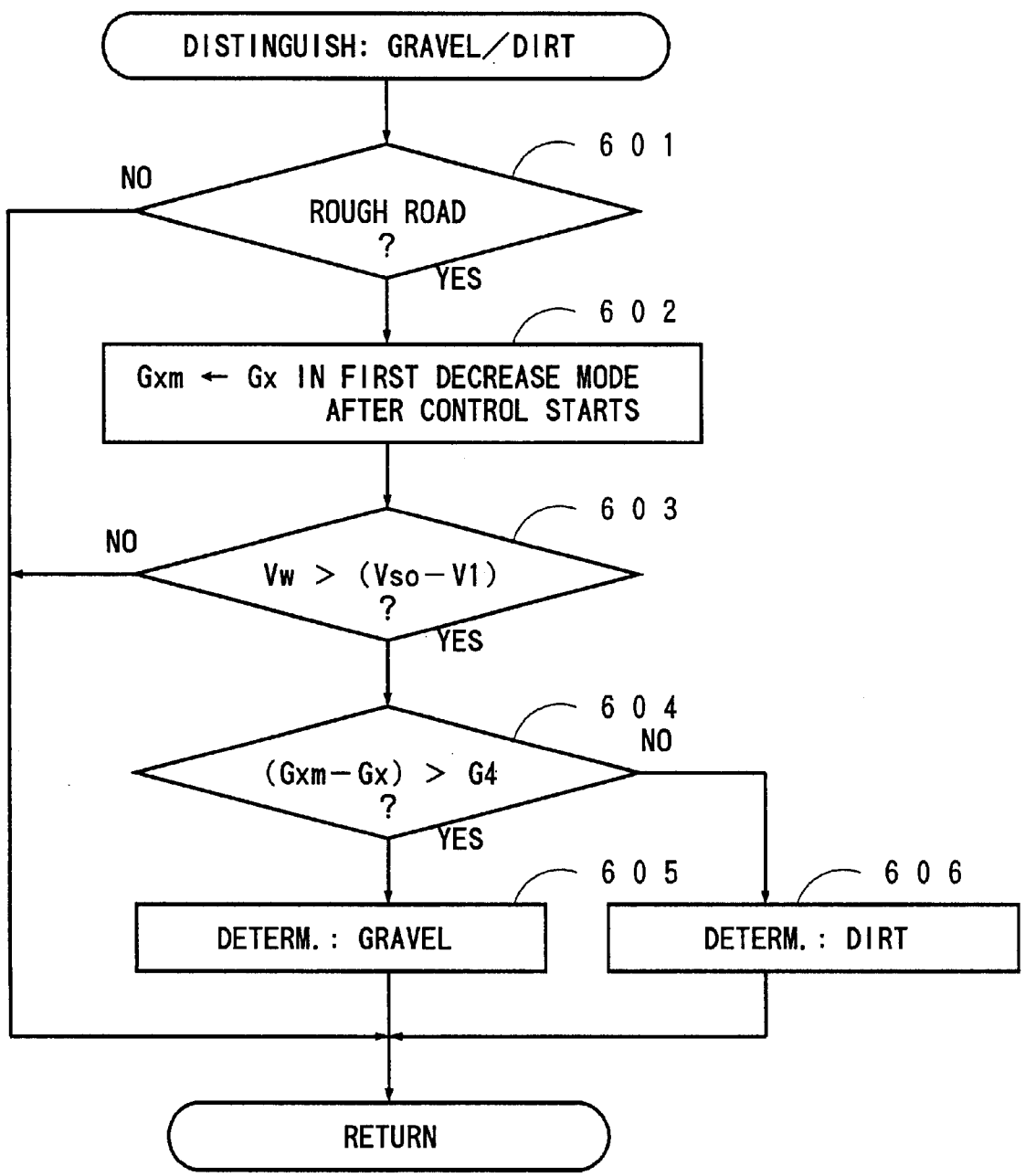
FIG. 11 is a flowchart showing a sub-routine to distinguish between a gravel road and a dirt road according to another embodiment of the present invention.

FIG. 11 shows the operation performed at Step 142 to distinguish between the gravel road and the dirt road. On the basis of the result of the detection of the rough road made at step 108, it is determined at Step 601 whether the vehicle is travelling on the rough road, or not. If it is determined at Step 601 that the vehicle is travelling on the rough road, the program proceeds to Step 602 where the output (Gx) of the linear G sensor 1 which was detected during the first pressure decreasing operation after the anti-skid control was initiated, is set to a deceleration (Gxm). Then, the program proceeds to Step 603 where the wheel speed (Vw) is compared in magnitude with a reference speed (Vso−V1), which is calculated from subtracting a predetermined speed (V1) from the estimated vehicle speed (Vso). If it is determined that the wheel speed (Vw) is equal to or smaller than the reference speed (Vso−V1), the program returns to the main routine.

Figure 15:
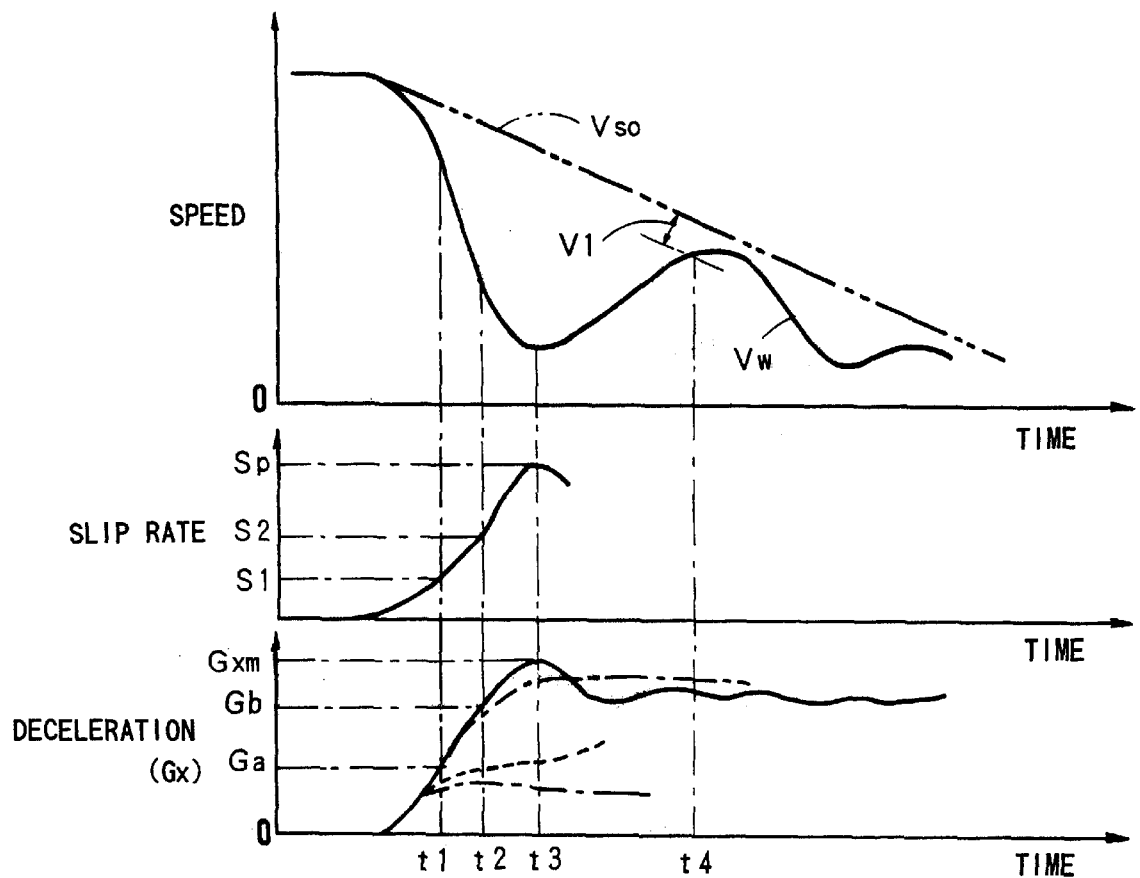
FIG. 15 is a diagram showing variations of wheel speed, slip rate and deceleration in an anti-skid control operation according to another embodiment of the present invention.

In the case where the wheel speed (Vw) is greater than the reference speed (Vso−V1), it means that the wheel speed (Vw) has been recovered to be substantially equal to the estimated vehicle speed (Vso), as will be described hereinafter. When the slip rate of a certain wheel increases on the gravel road, a gravel wall will be formed in front of the wheel. If the braking pressure is reduced in this state (at "t3" in FIG. 15), the wheel will ride over the gravel road to result in reducing the deceleration rapidly. On the contrary, the deceleration will be continuously increased gradually, without being decreased rapidly, in accordance with a characteristic as indicated by one-dot chain line crossed over a solid line indicative of the gravel road in the lower side in FIG. 15. Then, the program proceeds to Step 604, where a difference (Gxm−Gx) between the deceleration (Gxm) and the output (Gx) of the linear G sensor 1 detected when the wheel speed (Vw) exceeded the reference speed (Vso−V1) (at "t4" in FIG. 15), is compared with a fourth reference value (G4). If it is determined that the difference (Gxm−Gx) is greater than the fourth reference value (G4), the road on which the vehicle is traveling is determined to be the gravel road. If it is determined that the difference (Gxm−Gx) is equal to or smaller than the fourth reference value (G4), the road on which the vehicle is traveling is determined to be the dirt road. Thus, according to the present embodiment, not only the unpaved road can be detected, but also the gravel road and the dirt road can be distinguished one from the other.

Figure 12:
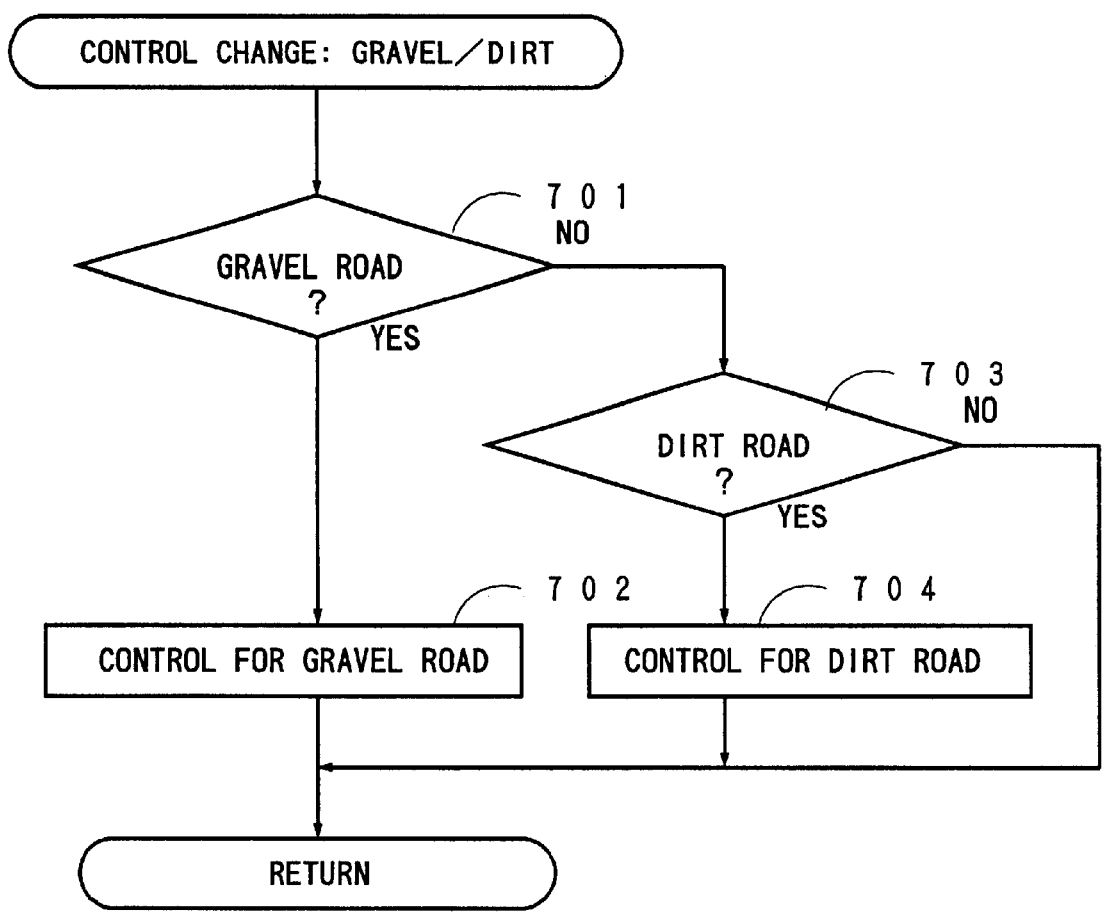
FIG. 12 is a flowchart showing a sub-routine to change the conditions of the anti-skid control for the gravel road or the one for the dirt road according to another embodiment of the present invention.

FIG. 12 shows the control change to be performed at Step 143 in FIG. 10, wherein the conditions of the anti-skid control are set for the gravel road or the dirt road. When the road on which the vehicle is traveling is determined to be the gravel road at Step 142, the program proceeds from Step 701 to Step 702, where the control for the gravel road is selected. When the road on which the vehicle is traveling is determined to be the dirt road at Step 142, the program proceeds from Steps 701, 703 to Step 704, where the control for the dirt road is selected. Unless the road on which the vehicle is traveling is the gravel road or dirt road, the program returns to the main routine. According to the control for the gravel road and the control for the dirt road, the hydraulic braking pressure in each wheel brake cylinder is controlled in the same manner as the control which is performed when the vehicle is traveling on the unpaved road. That is, the hydraulic braking pressure is pressurized to be higher than the hydraulic braking pressure which is controlled during the anti-skid control operation when the vehicle is travelling on a paved road. For this purpose, (1) the desired slip rate is set to be relatively large, so as to increase the pressure increasing amount and reduce the pressure decreasing amount, comparing with the braking pressure control when the vehicle is travelling on the paved road, (2) a hold mode, which is generally performed immediately after a pressure decrease mode was terminated, is prohibited, (3) the value ($\alpha_{UP}$) indicative of the upper limit of the vehicle acceleration ($\alpha$) used for the calculation of the estimated vehicle speed (Vso) is set to be relatively small, and (4) a reference vehicle speed for determining a termination of the control is set to be relatively high.

The conditions performed in the control for the gravel road at Step 702 and the control for the dirt road at Step 704 are set to be different from each other. The amount for modifying the pressure increase mode in the control for the dirt road is set to be smaller than the amount for modifying the pressure increase mode in the control for the gravel road. For example, the increasing rate and decreasing rate to the pressure increasing amount and the pressure decreasing amount used in the control for the dirt road are set to be smaller than those used in the control for the gravel road, respectively. When the value ($\alpha_{UP}$) indicative of the upper limit of the vehicle acceleration ($\alpha$) used for the calculation of the estimated vehicle speed (Vso) is set to be relatively small, the value ($\alpha_{UP}$) used in the control for the dirt road is set to be smaller than that used in the control for the gravel road.

Figure 13:
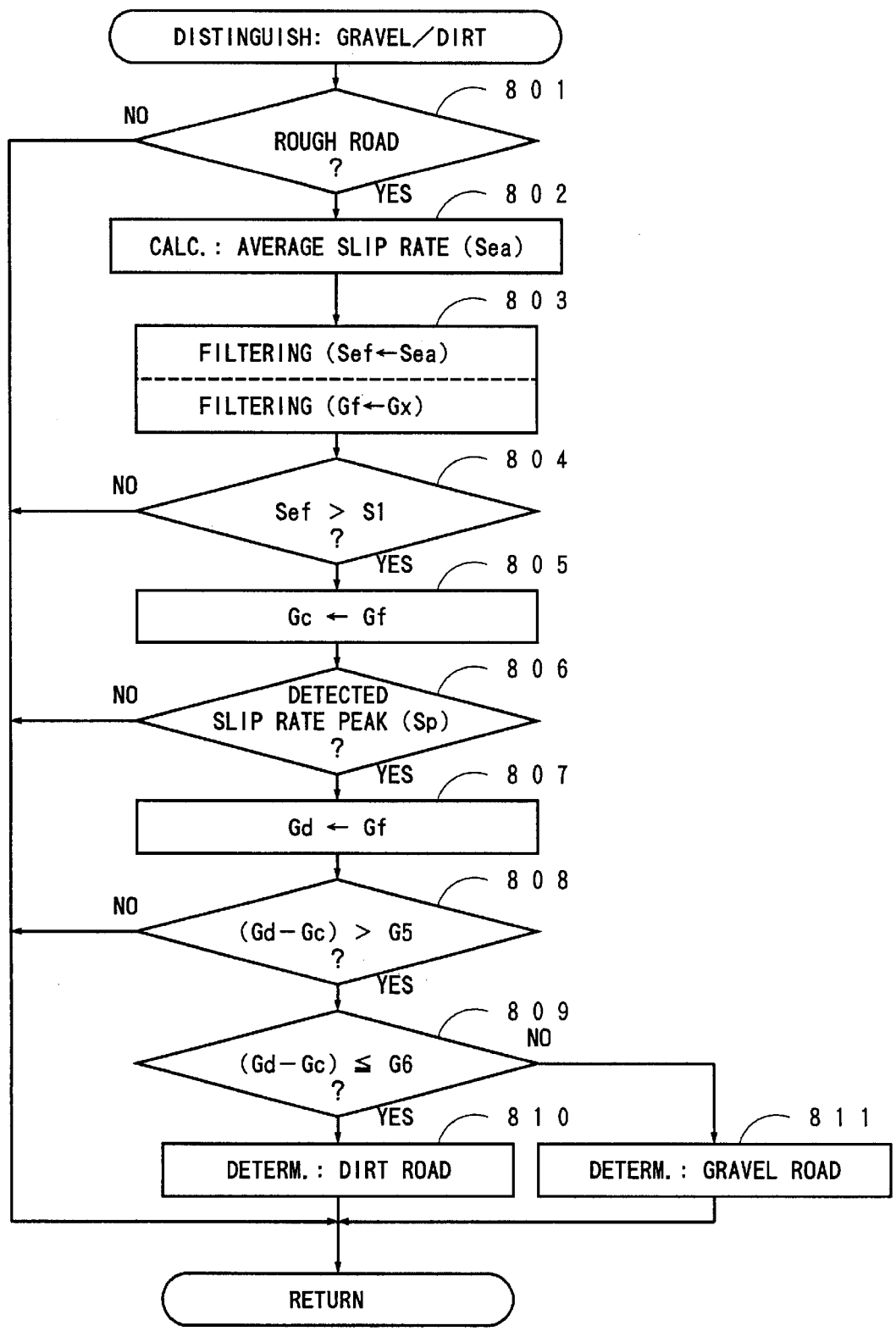
FIG. 13 is a flowchart showing a sub-routine to distinguish between the gravel road and the dirt road according to another embodiment of the present invention.
Figure 16:
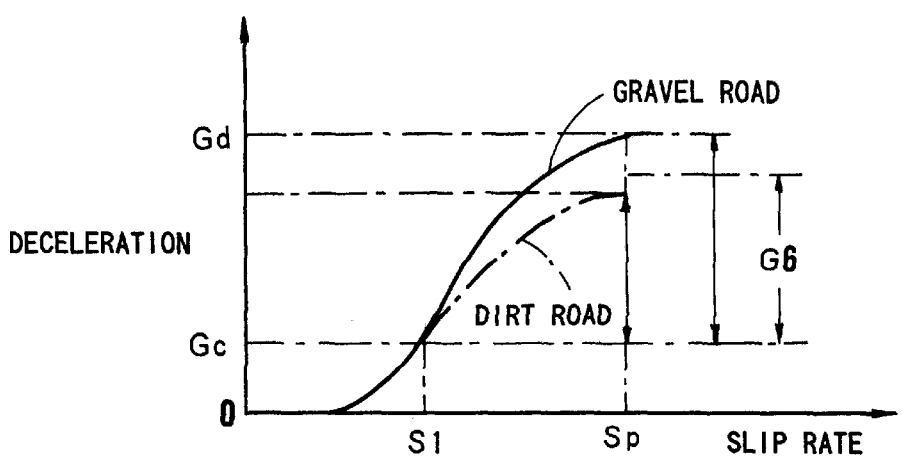
FIG. 16 is a diagram showing slip rate—deceleration characteristic to distinguish between the gravel road and the dirt road according to another embodiment of the present invention.

FIG. 13 shows another embodiment of the present invention to distinguish between the gravel road and the dirt road, wherein Steps 801–807 are the same as Steps 301–307 as shown in FIG. 5, so that the explanation about Steps 801–807 will be omitted. Then, at Step 808, a difference between the deceleration (Gd) and deceleration (Gc) is calculated, and compared in magnitude with a fifth reference value (G5). If the result is that the difference between the deceleration (Gd) and deceleration (Gc) is larger than the fifth reference value (G5), the program proceeds to Step 809, otherwise the program returns to the main routine. In other words, if the deceleration (Gd), which is detected when the slip rate peak (Sp) was detected, is larger than the deceleration (Gc), which is detected when the filtered value (Sef) of the average slip rate (Sea) exceeded the first reference slip rate (S1), by more than the fifth reference value (G5), the road on which the vehicle is traveling is determined to be the unpaved road. Then the program further proceeds to Step 809 where the difference between the deceleration (Gd) and deceleration (Gc) is compared in magnitude with a sixth reference value (G6). If the result is that the difference between the deceleration (Gd) and deceleration (Gc) is equal to, or smaller than the sixth reference value (G6), the program proceeds to Step 810, where the road is determined to be the dirt road. On the contrary, if the result is that the difference between the deceleration (Gd) and deceleration (Gc) is larger than the sixth reference value (G6), the program proceeds to Step 811, where the road is determined to be the gravel road, as shown in FIG. 16.

Figure 14:
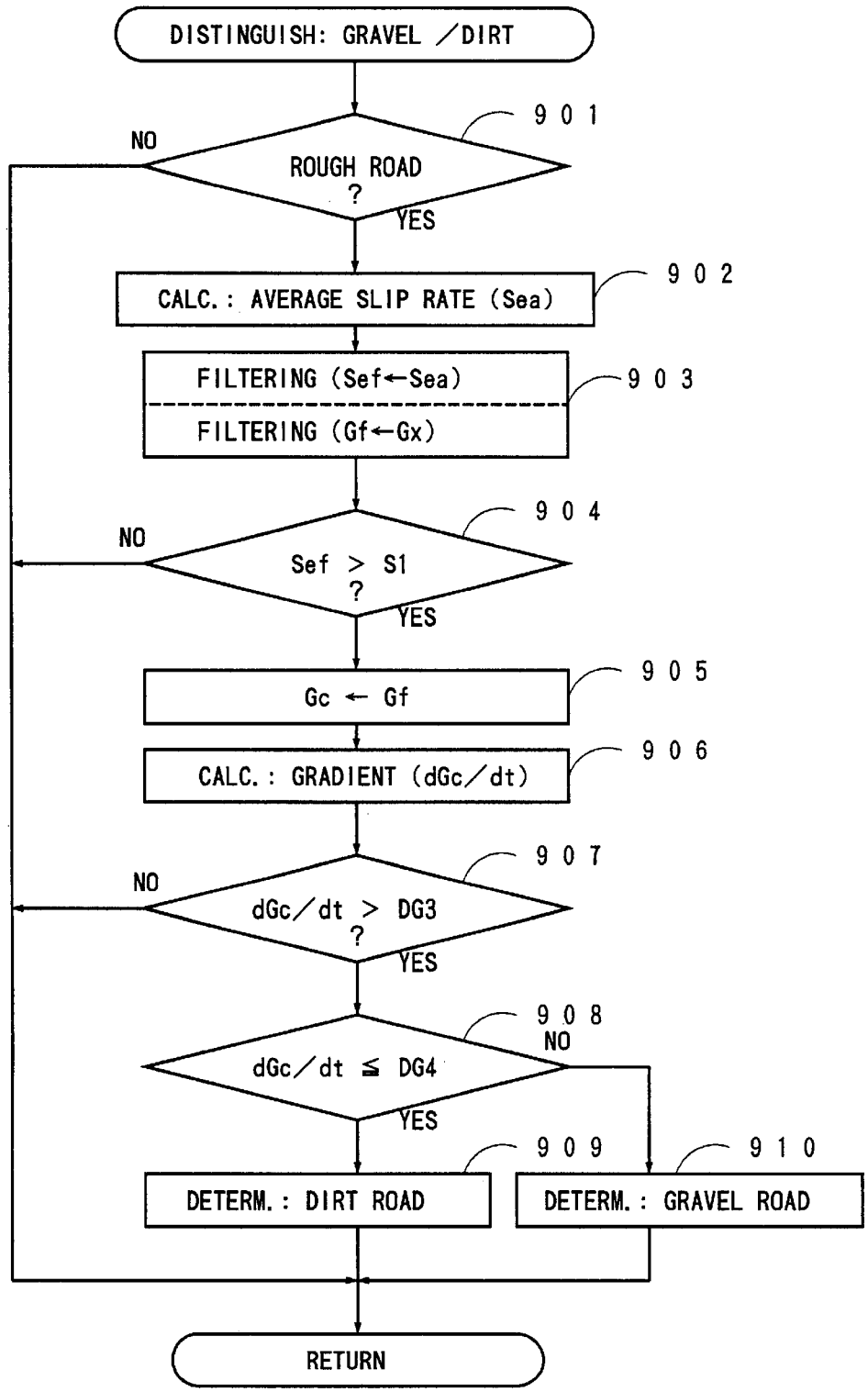
FIG. 14 is a flowchart showing a sub-routine to distinguish between the gravel road and the dirt road according to a further embodiment of the present invention.

FIG. 14 shows a further embodiment of the present invention to distinguish between the gravel road and the dirt road, wherein Steps 901–905 and Steps 909, 910 are the same as Steps 801–805 and Steps 810, 811 as shown in FIG. 13, so that the explanation about Steps 901–905 will be omitted. According to the operation for distinguishing between the gravel road and the dirt road in FIG. 14, the filtered value (Gf) of the output of the linear G sensor 1 produced when the filtered value (Sef) of the average slip rate (Sea) of all of the wheels exceeded the first reference slip rate (S1) is set at Step 905 as the deceleration (Gc), which is differentiated at Step 906. The differentiated value (dGc/dt) represents the gradient of the deceleration (Gc) obtained when the filtered value (Sef) of the average slip rate (Sea) of all of the wheels exceeded the first reference slip rate (S1). Then, the gradient (dGc/dt) is compared with a third reference gradient (DG3) at Step 907. If the gradient (dGc/dt) is larger than the third reference gradient (DG3), it will be determined at Step 908 that the road is unpaved. Therefore, the gradient (dGc/dt) is compared with a fourth reference gradient (DG4) at Step 908. If it is equal to or smaller than the fourth reference gradient (DG4), the program proceeds to Step 909, where the road is determined to be the dirt road. On the contrary, if the result is that the gradient (dGc/dt) is larger than the fourth reference gradient (DG4), the program proceeds to Step 910, where the road is determined to be the gravel road.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A system for detecting an unpaved road comprising:
   wheel speed sensors for detecting wheel speeds of wheels of a vehicle;
   vehicle speed detection means for detecting a vehicle speed of said vehicle;
   slip calculation means for calculating slip on the basis of the wheel speeds detected by said wheel speed sensors and the vehicle speed of said vehicle detected by said vehicle speed detection means;
   a linear acceleration sensor for detecting an acceleration of said vehicle in a longitudinal direction thereof and producing a signal linearly proportional to the detected acceleration;
   variation calculation means for calculating a variation of the signal produced by said linear acceleration sensor corresponding to a variation of the slip calculated by said slip calculation means; and
   determination means for comparing the variation of the signal calculated by said variation calculation means with a reference value, and determining that said vehicle is traveling on an unpaved road, if the variation exceeds the reference value.

2. A system for detecting an unpaved road as set forth in claim 1, wherein said slip calculation means is adapted to calculate the slip on the basis of the minimum value of the wheel speeds of all said wheels detected by said wheel speed sensors and the vehicle speed detected by said vehicle speed detection means.

3. A system for detecting an unpaved road as set forth in claim 1, wherein said slip calculation means is adapted to calculate the slip on the basis of an average speed of the wheel speeds of all of said wheels detected by said wheel speed sensors and the vehicle speed detected by said vehicle speed detection means.

4. A system for detecting an unpaved road as set forth in claim 1, wherein said variation calculation means is adapted to calculate a difference between a first signal detected by said linear acceleration sensor when the slip exceeded a first reference slip, and a second signal detected by said linear acceleration sensor when the slip exceeded a second reference slip, to output the difference as the variation.

5. A system for detecting an unpaved road as set forth in claim 1, wherein said variation calculation means is adapted to differentiate a first signal detected by said linear acceleration sensor when the slip exceeded a first reference slip, to output the differentiated value as the variation.

6. A system for detecting an unpaved road as set forth in claim 1, further comprising peak detection means for detecting a peak of the slip calculated by said slip calculation means, wherein said variation calculation means is adapted to calculate a difference between a first signal detected by said linear acceleration sensor when the slip exceeded a first reference slip, and a third signal detected by said linear acceleration sensor when said peak detection means detected the peak of the slip, to output the difference as the variation.

7. A system for detecting an unpaved road as set forth in claim 1, including means for determining a rough road, said determination means being prohibited from determining the unpaved road when said means for determining a rough road does not determine that the road is rough.

8. A system for detecting an unpaved road and preventing wheels of a vehicle from being locked during braking operation of said vehicle, comprising:

wheel speed sensors for detecting wheel speeds of wheels of a vehicle;

vehicle speed detection means for detecting a vehicle speed of said vehicle;

slip rate calculation means for calculating a slip rate on the basis of the wheel speeds detected by said wheel speed sensors and the vehicle speed of said vehicle detected by said vehicle speed detection means;

a linear acceleration sensor for detecting an acceleration of said vehicle in a longitudinal direction thereof and producing a signal linearly proportional to the detected acceleration;

variation calculation means for calculating a variation of the signal produced by said linear acceleration sensor corresponding to a variation of the slip rate calculated by said slip rate calculation means;

determination means for comparing the variation of the signal calculated by said variation calculation means with a reference value, and determining that said vehicle is traveling on an unpaved road, if the variation exceeds the reference value;

wheel brake cylinders operatively mounted on said wheels;

pressure generating means for pressurizing brake fluid to output hydraulic braking pressure in response to depression of a brake pedal;

actuating means disposed between said pressure generating means and said wheel brake cylinders for controlling the hydraulic braking pressure in each of said wheel brake cylinders in accordance with the result calculated by said slip rate calculation means; and adjusting means for adjusting said actuating means to control the hydraulic braking pressure in each of said wheel brake cylinders, when said determination means determines that said vehicle is traveling on the unpaved road, to be pressurized higher than the hydraulic braking pressure which is controlled when said vehicle is travelling on a paved road.

9. A system for detecting an unpaved road and preventing wheels of a vehicle from being locked as set forth in claim 8, wherein said determination means is adapted to calculate a difference between the output of said linear acceleration sensor produced when the hydraulic braking pressure in at least one of said wheel brake cylinders begins to be reduced by said actuating means and the output of said linear acceleration sensor detected when the wheel speed becomes substantially equal to the vehicle speed detected by said vehicle speed detection means after the hydraulic braking pressure begins to be reduced by said actuating means, and adapted to determine that the unpaved road on which said vehicle is traveling is a gravel road, if the difference exceeds a predetermined value, and determine that the unpaved road is a dirt road, if the difference is equal to or smaller than the predetermined value, and wherein said adjusting means is adapted to adjust said actuating means to control the hydraulic braking pressure in said at least one of said wheel brake cylinders when said determination means determines that said vehicle is traveling on the gravel road, to be pressurized on the basis of the conditions different from the conditions provided when said determination means determines that said vehicle is traveling on the dirt road, and to be higher than the hydraulic braking pressure which is controlled when said vehicle is travelling on a paved road.

10. A system for detecting an unpaved road and preventing wheels of a vehicle from being locked as set forth in claim 9, wherein said slip rate calculation means is adapted to calculate the slip rate on the basis of the minimum value of the wheel speeds of all of said wheels detected by said wheel speed sensors and the vehicle speed detected by said vehicle speed detection means.

11. A system for detecting an unpaved road and preventing wheels of a vehicle from being locked as set forth in claim 8, wherein said slip rate calculation means is adapted to calculate the slip rate on the basis of an average speed of the wheel speeds of all of said wheels detected by said wheel speed sensors and the vehicle speed detected by said vehicle speed detection means.

12. A system for detecting an unpaved road and preventing wheels of a vehicle from being locked as set forth in claim 9, wherein said adjusting means is adapted to adjust said actuating means to control the hydraulic braking pressure in said at least one of said wheel brake cylinders when said determination means determines that said vehicle is traveling on the gravel road, to be pressurized higher than the hydraulic braking pressure which is controlled when said vehicle is travelling on the dirt road.

13. A system for detecting an unpaved road and preventing wheels of a vehicle from being locked as set forth in claim 8, further comprising peak detection means for detecting a peak of the slip rate calculated by said slip rate calculation means, wherein said variation calculation means is adapted to calculate the variation of the signal detected by said linear acceleration sensor until said peak detection means detects the peak of the slip rate, and wherein said determination means is adapted to determine that the unpaved road on which said vehicle is traveling is a gravel road, if the variation exceeds a predetermined value, and determine that the unpaved road is a dirt road, if the variation is equal to or smaller than the predetermined value, and wherein said adjusting means is adapted to adjust said actuating means to control the hydraulic braking pressure in said at least one of said wheel brake cylinders when said determination means determines that said vehicle is traveling on the gravel road, to be pressurized on the basis of the conditions different from the conditions provided when said determination means determines that said vehicle is traveling on the dirt road, and to be higher than the hydraulic braking pressure which is controlled when said vehicle is travelling on a paved road.

14. A system for detecting an unpaved road and preventing wheels of a vehicle from being locked as set forth in claim 13, wherein said slip rate calculation means is adapted to calculate the slip rate on the basis of the minimum value of the wheel speeds of all of said wheels detected by said wheel speed sensors and the vehicle speed detected by said vehicle speed detection means.

15. A system for detecting an unpaved road and preventing wheels of a vehicle from being locked as set forth in claim 12, wherein said slip rate calculation means is adapted to calculate the slip rate on the basis of an average speed of the wheel speeds of all of said wheels detected by said wheel speed sensors and the vehicle speed detected by said vehicle speed detection means.

16. A system for detecting an unpaved road and preventing wheels of a vehicle from being locked as set forth in-claim 13, wherein said adjusting means is adapted to adjust said actuating means to control the hydraulic braking pressure in said at least one of said wheel brake cylinders when said determination means determines that said vehicle is traveling on the gravel road, to be pressurized higher than the hydraulic braking pressure which is controlled when said vehicle is travelling on the dirt road.

* * * * *